United States Patent
Jain

(10) Patent No.: US 9,720,948 B2
(45) Date of Patent: Aug. 1, 2017

(54) FAST SEARCHING USING MULTIDIMENSIONAL INDEXING

(71) Applicant: Vivanti N. Jain, M.D., F.A.C.S., Santa Monica, CA (US)

(72) Inventor: Vivanti N. Jain, Santa Monica, CA (US)

(*) Notice: Subject to any disclaimer, the term of this patent is extended or adjusted under 35 U.S.C. 154(b) by 393 days.

(21) Appl. No.: 14/539,488

(22) Filed: Nov. 12, 2014

(65) Prior Publication Data

US 2016/0132539 A1    May 12, 2016

(51) Int. Cl.
*G06F 17/30*    (2006.01)

(52) U.S. Cl.
CPC ............ *G06F 17/30333* (2013.01)

(58) Field of Classification Search
CPC .................................. G06F 17/30333
See application file for complete search history.

(56) References Cited

U.S. PATENT DOCUMENTS

| | | | | |
|---|---|---|---|---|
| 6,182,060 B1* | 1/2001 | Hedgcock | ......... | G06F 17/30592 |
| 6,741,983 B1* | 5/2004 | Birdwell | ........... | G06F 17/30327 |
| 6,859,455 B1* | 2/2005 | Yazdani | ............ | G06F 17/30985 370/392 |
| 2009/0018993 A1* | 1/2009 | McCool | ............ | G06F 17/30442 |

* cited by examiner

*Primary Examiner* — Kris Mackes
(74) *Attorney, Agent, or Firm* — Smyrski Law Group, A P.C.

(57) ABSTRACT

A method and apparatus for performing relatively fast record searching is provided. The design includes providing one alphanumeric key to any record of a plurality of records not including an alphanumeric key, providing one text description comprising at least one word to any record of the plurality of records not including a text description having at least one word, and establishing a multidimensional index, where for each record there is provided in the multidimensional index a pointer pointing from one alphanumeric key to one associated record, a text description pointer pointing from each text description to the one associated record, a first reverse word index pointer pointing from each word to one alphanumeric key, and a second reverse word index pointer pointing from each word to one text description. Records are searched using the multidimensional index.

20 Claims, 3 Drawing Sheets

FAST SEARCHING USING MULTIDIMENSIONAL INDEXING

BACKGROUND

I. Field

The present disclosure relates generally to the field of data storage and retrieval, and more specifically to rapidly searching records using multidimensional indexing.

II. Description of the Related Art

Current data storage on a number of systems, such as medical systems, product/inventory systems, and the like, tend to be slow when retrieving data records. As an example, certain types of medical records are stored and retrieved using an online or "cloud" storage component. In typical operation, a user may wish to obtain a medical record for a patient or an inventory part record, or other record, and may enter appropriate information on his or her local device. The local device then seeks the information from a remote source, such as an online or cloud source, and the record is downloaded to the user's local device. In situations where large records or large numbers of records are involved, it is not unusual for this process to take several seconds on a typical internet connection, and sometimes can take several minutes depending on various factors, including internet load and speed, size and quantity of records, processing speed and storage capability on the network, and so forth.

In the medical field in particular, solutions currently exist that require several minutes to load a patient record in certain situations. Such loading times are particularly inconvenient. Local solutions have been suggested, but the problem with some local solutions is that data and records can be updated at any time, and long delays between record updates can be problematic, and in worst case scenarios, severely detrimental to the patient. As an example, a local solution for medical records may entail obtaining all existing medical records from a central source on a regular basis, such as once a week. The user's device may obtain all records locally from a remote source. However, if the patient is prescribed drug X the following day, and a physician retrieves the record a few days later, the physician may prescribe drug Y without knowledge that the patient has also begun taking drug X.

However, most notably, the time required to retrieve records is of greatest importance. Hospital staff, medical office staff, warehouse personnel, and others with a need to obtain information from large records or voluminous records do not have time to wait minutes to perform a simple search to see if, for example, a specific crankshaft is available at the Boise, Id. warehouse. Saving minutes or even seconds, or in certain high volume situations, tenths of seconds, can be extremely valuable to persons who search records and deal with customers on a regular basis.

It would therefore be beneficial to provide a computing system that offers search capability for voluminous records that improves on search methods currently available, particularly in speed of searching. Improvements in time and overall search efficiency would be particularly advantageous in a number of situations where efficient record retrieval is of particular importance.

SUMMARY

According to the present design, there is provided a computing system for identifying records, comprising at least one hardware processor and at least one storage device configured to store software instructions configured for execution by the at least one hardware processor to cause the computing system to provide one alphanumeric key to any record of a plurality of records not including an alphanumeric key, provide one text description comprising at least one word to any record of the plurality of records not including a text description comprising at least one word, establish a multidimensional index comprising at least one four element index associated with each record, the four element index comprising a pointer pointing from one alphanumeric key to one associated record, a text description pointer pointing from each text description to the one associated record, a first reverse word index pointer pointing from each word to one alphanumeric key, and a second reverse word index pointer pointing from each word to one text description, and search the plurality of records using the multidimensional index.

According to another embodiment of the present design, there is provided a method that includes providing one alphanumeric key to any record of a plurality of records not including an alphanumeric key, providing one text description comprising at least one word to any record of the plurality of records not including a text description having at least one word, and establishing a multidimensional index using a processing device, where for each record there is provided in the multidimensional index a pointer pointing from one alphanumeric key to one associated record, a text description pointer pointing from each text description to the one associated record, a first reverse word index pointer pointing from each word to one alphanumeric key, and a second reverse word index pointer pointing from each word to one text description. Records are searched using the multidimensional index.

According to a further embodiment of the present design, there is provided a computing apparatus including a processor and a local storage device configured to maintain a multidimensional index. The processor is configured to provide one alphanumeric key to any record of a plurality of records not including an alphanumeric key and further configured to provide one text description comprising at least one word to any record of the plurality of records not including a text description comprising at least one word. The multidimensional index is determined by the processor and comprises at least one four element index associated with each record, the four element index comprising a pointer pointing from one alphanumeric key to one associated record, a text description pointer pointing from each text description to the one associated record, a first reverse word index pointer pointing from each word to one alphanumeric key, and a second reverse word index pointer pointing from each word to one text description.

Various aspects and features of the disclosure are described in further detail below.

DETAILED DESCRIPTION

The techniques described herein may be used for various computing devices including but not limited to computer networks, interconnected servers, and/or the "cloud," and certain functionality may be provided with computing devices including but not limited to cellular phones, smartphones, tablets, Bluetooth devices, and virtually any other device that employs data and data records and has computational ability.

The present design is a system and method for performing a rapid search of records. Data is stored on a local device and a unique method of record searching is employed that improves on retrieval speed of the records. Such a computer system or computing device operating in the manner described herein requires a very small amount of time, typically less than one second but in many cases on the order of or less than tenths of seconds, to locate records in large groups of records.

Figure 1:
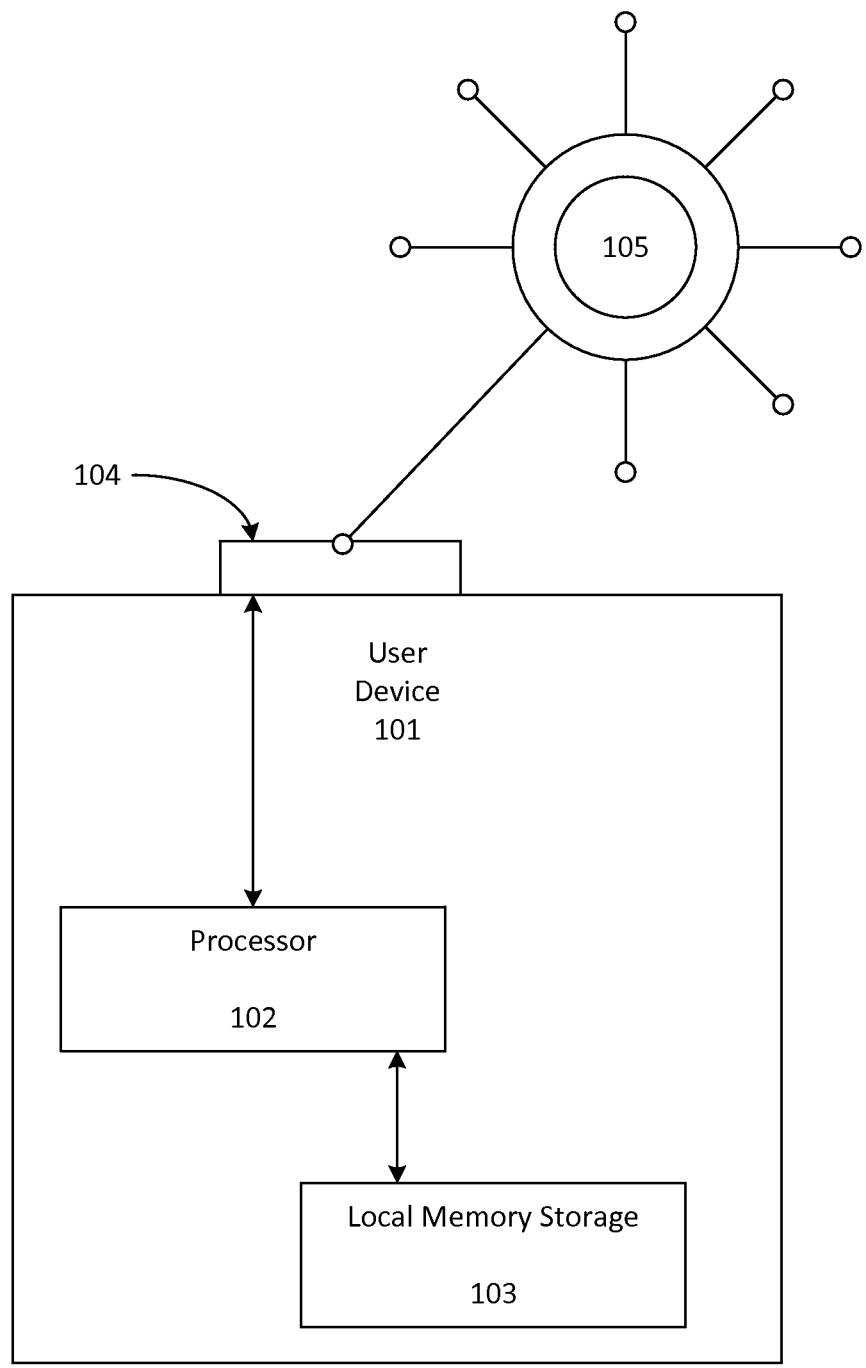
FIG. 1 illustrates a general overview of one embodiment of the hardware employed in present design.

FIG. 1 illustrates the general overall hardware concept employed. User device 101 includes a processor 102 and local memory storage 103, where the local memory storage 103 may comprise random access memory (RAM), a traditional hard drive, a solid state drive (SSD), removable drive, or any other local storage device known in the art. User device 101 typically includes an interface 104, such as a hardwire or wireless connection, that enables internet connectivity between the user device and a remote data source 105. Remote data source 105 may be the "cloud," a remote server or servers, or any type of remote computing device or arrangement configured to store data and/or data records. Remote data source 105 may include multiple devices distributed over multiple locations. Remote data source may be a computing device in the same location as the user device 101, i.e. physically proximate to user device 101, and in certain instances remote data source 105 may be provided in, as part of, or connected to user device 101. Remote data source 103 may include records, in a single location or distributed over multiple devices.

The user device 101 may be a computing device such as a personal computer, laptop, Chromebook, tablet, smartphone, or any other device able to receive information and process information, preferably a device connectable to the internet. Also, while the internet is contemplated, the present design may use removable or transferrable data maintenance devices such as compact disks (CDs) or flash drives or other devices without the need to employ the internet. However, it is contemplated that records will typically be maintained at a remote location. Such a remote location, i.e. the remote data source 105, may be a storage device (hard drive, etc.) near or, m as discussed above, even in or part of user device 101.

In operation, the user device 101 and the processor 102 seeks available records at a given time, which may be a time desired by the user or a scheduled time that is periodic or aperiodic. The relevant records are typically maintained on the remote device 105, wherein the remote device is used as a repository, and updated records are provided to remote device 105. Although FIG. 1 illustrates a single user device 101, it is to be understood that numerous user devices may be employed or may connect to remote device 105 and may obtain and/or update records maintained on remote device 105. Multiple records may be transferred from remote device 105 to user device 101 via the internet, VPN, or any other connection known in the art, or the records may be maintained and/or processed on the remote device 105.

In one embodiment, the records are provided to the user device 101 and are processed using the processor 102. Once records have been retrieved, the processor 102 may direct the records to be stored to local memory storage 103. In another embodiment, records may be processed while at the remote device 105 or another device (not shown), or on multiple devices using a remote processor (also not shown). The goal of processing in this manner is to develop the multidimensional index disclosed herein, and development of such an index may be done anywhere using any appropriate device capable of performing the function.

A primary benefit of the present design, and one that improves on prior designs and procedures, is the ability to rapidly and efficiently search through a multidimensional index to locate records. Previous designs required a single record or multiple records to be obtained from the remote device, including administrative time issues such as login/verification, and the desired record or records would be provided from a remote device to a local device and finally the records searched, wherein searching for a particular record could take seconds or more frequently minutes.

The present design instead performs a specific set of operations that streamlines and speeds up the search process. Again, it is assumed that all of the records are available for initial processing, wherein the initial processing comprises determining a multidimensional index from the available records. The records may be specified with or without a key, such as an alphanumeric key of variable length. Volume of records may be quite large, such as on the order of over 100,000 records, and as noted, may be maintained anywhere as long as they can be evaluated and processed as described herein.

Figure 2:
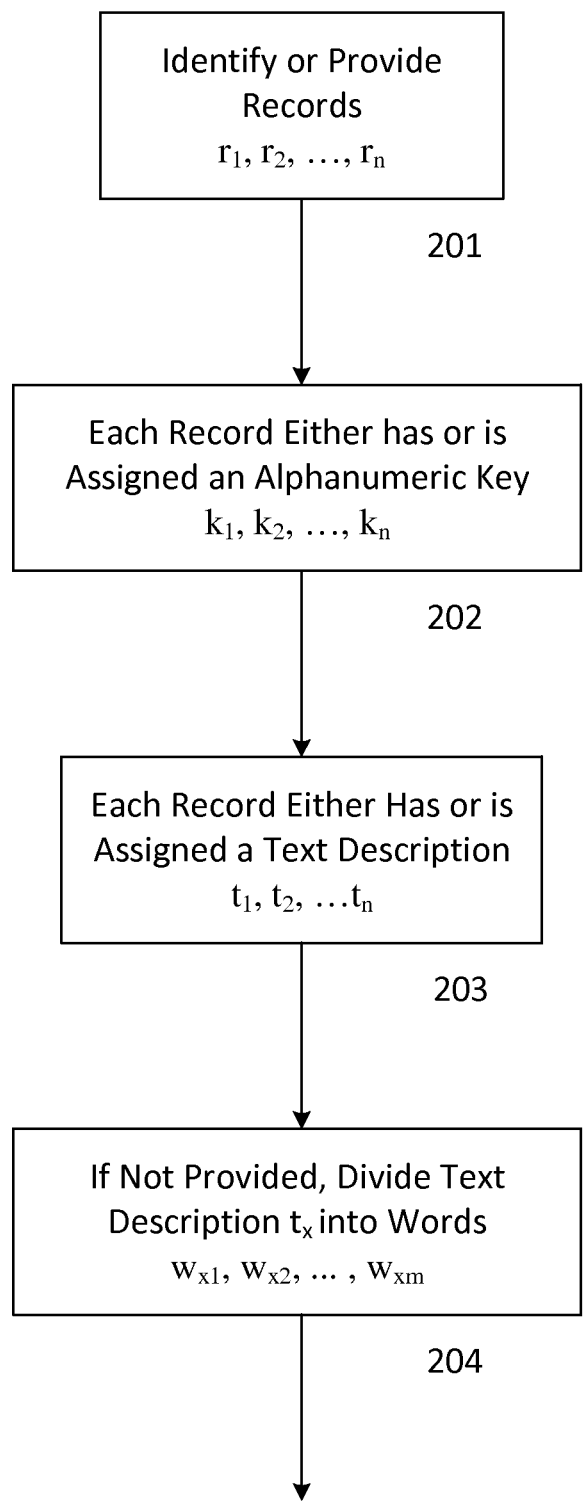
FIG. 2 is a flowchart representing initial processing according to the present design.

In one embodiment, the processor 102 initially performs the functions illustrated in FIG. 2. Certain elements of FIG. 2 are optional in that they may be performed by the user device 101 or may be provided in some other manner before being received by the user device 101, but these functions are performed prior to, for example, the functions illustrated in FIG. 3.

From FIG. 2, records $r_1, r_2, \ldots, r_n$ are provided or identified at point 201. Each record is unique. Each record either has or is assigned, by the processor 102 or some other appropriate processing device, a unique or non-unique corresponding alphanumeric key, $k_1, k_2, \ldots, k_n$ of variable length at point 202. Each record has or is assigned a corresponding text description, $t_1, t_2, \ldots t_n$ of variable length that is unique at point 203. Thus every record has a minimum of one unique key allowing access, and every record $r_x$ has a unique alphanumeric key $k_x$ of variable length and a corresponding text description $t_x$ of variable length. The alphanumeric key and the text description is typically one parameter of a record but may be separate or may be assigned, either by a processor or by an individual (administrator or user) using a processor. At point 204 the system divides each text description $t_x$ into words $w_{x1}, w_{x2}, \ldots, w_{xm}$, referred to herein as "keywords," representing the words of text separated by an arbitrary separator, e.g., a space, but any character could be used. The same character, e.g. the same alphanumeric character, is used in every record/text description as a separator between the words provided or established.

In the present design, a system administrator or other individual may determine the record parameters that may be used as $k_r$ and $t_x$. For example, an administrator or user may determine that records will be numbered from 10000 upward and the text description will be the patient's last name followed by first name followed by middle initial, followed by a patient number, etc. However, once these are established, the system assigns them to the multidimensional index, i.e. record X is numbered 16390, patient last name is Jones, first name Mary, middle initial M, patient number 36445, to the record. In certain instances, if desired, a user or administrator can assign these attributes, however such assignment may be cumbersome, but a processor is employed in assigning the attribute(s) to the multidimensional index.

Figure 3:
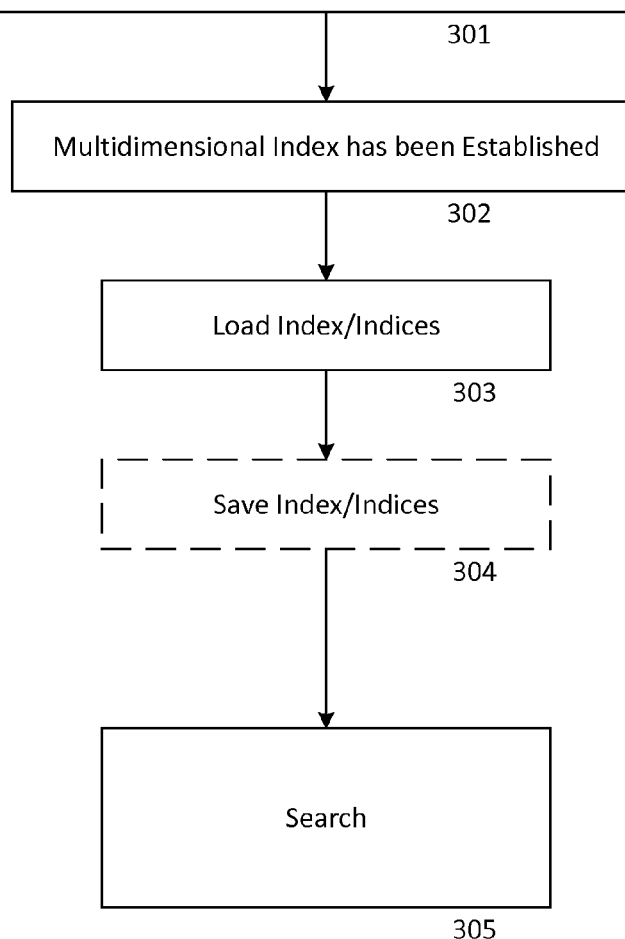
FIG. 3 illustrates creation of the multidimensional index for use in searching through the records.

FIG. 3 shows the creation of the multidimensional index. In FIG. 3, the processor 102 of user device 101 may, in one embodiment, create either multiple indices or a single multidimensional index. The indices can be a sorted array of pointers to structures, each array including the alphanumeric key, text description, and words of the record, and may include pointers to the record. Pointers may be provided that point to, for example, a particular address at a remote decide or devices, or a particular address at the local device, or wherever the record resides. In one implementation, the indices may be determined as shown at point 301:

$k_x \rightarrow r_x$ (mapping or pointing from the alphanumeric key to the record)

$t_x \rightarrow r_x$ (mapping or pointing from the text description to the record)

$w_{xz} \rightarrow k_x$ for each z from 1 to m for the corresponding $t_x$ (a reverse word index mapping/pointing from the word to the alphanumeric key)

$w_{xz} \rightarrow t_x$ for each z from 1 to m for the corresponding $t_x$ (a reverse word index mapping/pointing from the word to the text description)

These resultant indices thus include four indices for a given record, including two reverse word index indices. The indices are created at point 301 and the system associates the four indices to each record. The indices therefore provide, for example, a network address of the record and could represent an offset to a file on a disk or a record in a specific memory location on the local device or on a remote device.

The resultant multidimensional index is deployed to the local device 101, where it can be used in searching for specific records. Additionally, the index so created can be transmitted to any other computing device able to perform search functionality using such an index such that the other devices can search the records rapidly.

Indexing in this manner greatly speeds up searching. Searching may be performed by entering a set of alphanumeric characters, and using the multidimensional index the system and/or particular computing device seeks to match the text being searched with the record. Once the search string matches the indices the record can be located, such as by performing a single disk seek, with the pointer or index pointing to the record in question, to retrieve the record. Searching in this manner is generally understood to those of skill in the art, but typically involves matching character strings, and the use of keywords, text descriptions, and strings of words within the text descriptions as well as the reverse word indices called for herein heightens the likelihood that a match will be found and tends to be significantly faster than other record retrieval methods, including but not limited to those that perform online searching and retrieval.

The system may therefore provide or maintain the indices as a multidimensional array. Thus each record has the foregoing four indices, each record having associated four individual indexes or a single multidimensional index, and point 302 indicates the multidimensional index has been established. According to point 303, the indices are loaded once upon initiating the searching function or software. The indices may be loaded using a separate thread for each array and loaded simultaneously. Once loaded, the indices need not be resorted or reproduced absent unusual circumstances. The system may add or delete nodes (records with associated indices) as needed to maintain the sorted index/multidimensional array. Added records may result in a device, such as the local device 101 but any device including a processor, to create additional indices, and in the case of one record four indices, and append the indices to the multidimensional index. The multidimensional index so created may be propagated to devices employing the previous version of the multidimensional index or other devices. The multidimensional index may be provided to any device seeking to search the records of interest. At point 304, the altered index/multidimensional array is saved, such as to a local hard disk, for subsequent loading if the program or computer is shut down.

As shown at point 305, once loaded, such as into local storage such as Random Access Memory (RAM), the system enables the user to perform a search, such as a binary search with matching ability for partial words or strings of text utilizing the multidimensional index. Searching in this manner can be partial key, partial word, or multiple word with or without logical operations such as AND or OR. Using a currently available computing device, the records become available in fractions of seconds. The resulting $k_x$ or $t_x$ uniquely identifies the record for retrieval and such record may be retrieved based on the multi-dimensional index.

The system may recreate the multidimensional index in the case of a severe hardware failure using the methodology of FIGS. 2 and 3, i.e. recreated from the records. Such operation may be done on off periods or in the background with no appreciable change to ultimate searching speed. Revisions made to records and/or the indices may be provided, for example to a remote storage location such that the records may be searched by and located by other user devices.

Example applications may include inventory searching using the multidimensional index methodology. Each item in inventory may be provided with a unique part number $k_x$ and unique description $t_x$. The records may include any other relevant information relating to the part, such as number of units available, ship date, serial number, product number, alternate description, and so forth, and such other parts of the record may or may not be provided as searchable words. In this and other examples, the multidimensional index is established and the records may change, with new records resulting in a processing of the single record and a single multidimensional index addition. The index is saved for later re-loading in the event that items are added to or removed from the inventory without the need to re-sort the index. Only rarely, for example, with a hardware failure or a very significant change in inventory, would the entire index need to be recreated.

Alternately, the present design may be employed with a dictionary, where the keys are the entries of the dictionary and are non-unique. The text is the definition and the words are words of the definition. As may be appreciated, different index associations can be provided for different applications or even the same application. For example, common word misspellings could be provided as words in a dictionary situation if desired. In the aforementioned inventory situation, words may include the aforementioned number of units available, ship date, etc., but other words could be added, such as price, where produced, or virtually anything having to do with the part. Such words could slow or speed up search, in that there might be a larger number of overlapping or identical words or partial words, slowing the search, but such words could enable a user to locate an item based on very limited information, i.e. a spark plug made at a company's Tucson plant.

A further application of the present design is use in a coding system such as a card catalogue, ICD-10 coding system, CPT coding system, and so forth. Such a system may be implemented with keys, text, and words that are readily defined.

Another application of the present design is for use in correlating certain values quickly, such as in a facial recognition application. In such a design, the system would pre-process information, such as categorizing information from a photograph and attaching labels to the information—brown eyes, blue eyes, narrow chin, oval shaped face, dark skin tone, light skin tone, and so forth. Once the information has been categorized, the system could process the records—individual X has brown hair, green eyes, light skin tone, wide jaw, etc., and numbers or values could be accorded to features. The system processes the records according to the description provided herein using keywords, text/words, and the reverse word index, e.g. a key that is a record number, and a text description that includes the attributes of the photograph. Other correlation of records applications could be used employing the present system.

It is anticipated that updating of records retrieved in the manner discussed will not change the location of the record, i.e. even though the record may be changed to include multiple entries with a significant amount of, for example, alphanumeric text, pointers and indices described herein will not change. In other words, the record will be located at the same position in memory even after it is saved with the additional record text or data provided. While indices and pointers can be generated or regenerated as desired, the addition of a new record is the situation where a new set of four indices must be provided or generated.

Thus the present system includes providing records, where each record is unique and has a corresponding key and a corresponding text description that is unique, wherein each text description is divided into a plurality of words. The system constructs an index comprising a sorted array of pointers wherein the indices map each keyword to one record, each text description to one record, and two reverse word indices mapping each word to a keyword and, separately, each word to a text description. Searching for words points, via the indices, to keywords and text descriptions, which in turn point to records or a single record.

Thus according to the present design, there is provided a computing system for identifying records, comprising at least one hardware processor and at least one storage device configured to store software instructions configured for execution by the at least one hardware processor to cause the computing system to provide one alphanumeric key to any record of a plurality of records not including an alphanumeric key, provide one text description comprising at least one word to any record of the plurality of records not including a text description comprising at least one word, establish a multidimensional index comprising at least one four element index associated with each record, the four element index comprising a keyword pointer pointing from each keyword to one associated record, a text description pointer pointing from each text description to the one associated record, a first reverse word index pointer pointing from each word to one keyword, and a second reverse word index pointer pointing from each word to one text description, and search the plurality of records using the multidimensional index.

According to another embodiment of the present design, there is provided a method that includes providing one alphanumeric key to any record of a plurality of records not including an alphanumeric key, providing one text description comprising at least one word to any record of the plurality of records not including a text description having at least one word, and establishing a multidimensional index using a processing device, where for each record there is provided in the multidimensional index a keyword pointer pointing from each keyword to one associated record, a text description pointer pointing from each text description the one associated record, a first reverse word index pointer pointing from each word to one keyword, and a second reverse word index pointer pointing from each word to one text description. Records are searched using the multidimensional index.

According to a further embodiment of the present design, there is provided a computing apparatus including a processor and a local storage device configured to maintain a multidimensional index. The processor is configured to provide one alphanumeric key to any record of a plurality of records not including an alphanumeric key and further configured to provide one text description comprising at least one word to any record of the plurality of records not including a text description comprising at least one word. The multidimensional index is determined by the processor and comprises at least one four element index associated with each record, the four element index comprising a keyword pointer pointing from each keyword to one associated record, a text description pointer pointing from each text description to the one associated record, a first reverse word index pointer pointing from each word to one keyword, and a second reverse word index pointer pointing from each word to one text description.

In one or more exemplary designs, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

The previous description of the disclosure is provided to enable any person skilled in the art to make or use the disclosure. Various modifications to the disclosure will be readily apparent to those skilled in the art, and the generic principles defined herein may be applied to other variations without departing from the scope of the disclosure. Thus, the disclosure is not intended to be limited to the examples and designs described herein but is to be accorded the widest scope consistent with the principles and novel features disclosed herein.

What is claimed is:

1. A computing system for identifying records, comprising:
   at least one hardware processor; and
   at least one storage device configured to store software instructions configured for execution by the at least one hardware processor to cause the computing system to:
   provide one alphanumeric key to any record of a plurality of records not including an alphanumeric key;
   provide one text description comprising at least one word to any record of the plurality of records not including a text description comprising at least one word;
   establish a multidimensional index comprising at least one four element index associated with each record, the four element index comprising:
      a pointer pointing from one alphanumeric key to one associated record;
      a text description pointer pointing from each text description to the one associated record;
      a first reverse word index pointer pointing from each word to one alphanumeric key; and
      a second reverse word index pointer pointing from each word to one text description; and
   search the plurality of records using the multidimensional index.

2. The computing system of claim 1, wherein each alphanumeric key in the multidimensional index is unique.

3. The computing system of claim 1, wherein at least one of the pointer, the text description pointer, the first reverse word index pointer, and the second reverse word index pointer comprise an offset to a file containing one associated record.

4. The computing system of claim 1, wherein the multidimensional index is maintained on a local storage device and the plurality of records are maintained external to the local storage device.

5. The computing system of claim 1, wherein additional records are processed to include one alphanumeric key and one text description comprising at least one word and the multidimensional index is supplemented to include one further four element index.

6. The computing system of claim 1, wherein words in the text description are separated from adjacent words by an alphanumeric separator.

7. The computing system of claim 4, wherein the multidimensional index is loaded into the local storage device using a separate thread for each four element index.

8. A method for identifying records using a processor, comprising:
   employing the processor to provide one alphanumeric key to any record of a plurality of records not including an alphanumeric key;
   employing the processor to provide one text description comprising at least one word to any record of the plurality of records not including a text description comprising at least one word;
   employing the processor to establish a multidimensional index comprising at least one four element index associated with each record, the four element index comprising:
      a pointer pointing from one alphanumeric key to one associated record;
      a text description pointer pointing from each text description to the one associated record;
      a first reverse word index pointer pointing from each word to one alphanumeric key; and
      a second reverse word index pointer pointing from each word to one text description; and
   searching the plurality of records using the multidimensional index.

9. The method of claim 8, wherein each alphanumeric key in the multidimensional index is unique.

10. The method of claim 8, wherein at least one of the pointer, the text description pointer, the first reverse word index pointer, and the second reverse word index pointer comprise an offset to a file containing one associated record.

11. The method of claim 8, wherein the multidimensional index is maintained on a local storage device and the plurality of records are maintained external to the local storage device.

12. The method of claim 8, wherein additional records are processed to include one alphanumeric key and one text description comprising at least one word and the multidimensional index is supplemented to include one further four element index.

13. The method of claim 8, wherein words in the text description are separated from adjacent words by an alphanumeric separator.

14. The method of claim 8, wherein the multidimensional index is loaded into the local storage device using a separate thread for each four element index.

15. A computing apparatus, comprising:
   a processor; and
   a local storage device configured to maintain a multidimensional index;
   wherein the processor is configured to provide one alphanumeric key to any record of a plurality of records not including an alphanumeric key and further configured to provide one text description comprising at least one word to any record of the plurality of records not including a text description comprising at least one word;
   wherein the multidimensional index is determined by the processor and comprises at least one four element index associated with each record, the four element index comprising:
      a pointer pointing from one alphanumeric key to one associated record;
      a text description pointer pointing from each text description to the one associated record;
      a first reverse word index pointer pointing from each word to one alphanumeric key; and
      a second reverse word index pointer pointing from each word to one text description.

16. The computing apparatus of claim 15, wherein each alphanumeric key in the multidimensional index is unique.

17. The computing apparatus of claim 15, wherein at least one of the pointer, the text description pointer, the first reverse word index pointer, and the second reverse word index pointer comprise an offset to a file containing one associated record.

18. The computing apparatus of claim 15, wherein additional records are processed to include one alphanumeric key and one text description comprising at least one word and the multidimensional index is supplemented to include one further four element index.

19. The computing apparatus of claim 15, wherein words in the text description are separated from adjacent words by an alphanumeric separator.

20. The computing apparatus of claim 15, wherein the multidimensional index is loaded into the local storage device using a separate thread for each four element index.

\* \* \* \* \*